US005933399A

United States Patent [19]

Kim

[11] Patent Number: 5,933,399

[45] Date of Patent: Aug. 3, 1999

[54] OPTICAL DISC RECORDING METHOD AND APPARATUS WITH VARIABLE SPEED CONTROL FUNCTION

[75] Inventor: Dae Young Kim, Seoul, Rep. of Korea

[73] Assignee: LG Electronics Inc., Seoul, Rep. of Korea

[21] Appl. No.: 08/987,017

[22] Filed: Dec. 9, 1997

[30] Foreign Application Priority Data

Dec. 13, 1996 [KR] Rep. of Korea ...................... 96-65291

[51] Int. Cl.[6] ........................................................ G11B 5/09

[52] U.S. Cl. ................................................ 369/50; 369/48

[58] Field of Search ................................. 369/47, 48, 50, 369/53, 54, 58, 60; 360/71, 73.01, 73.03

[56] References Cited

U.S. PATENT DOCUMENTS

| | | | |
|---|---|---|---|
| 4,542,423 | 9/1985 | Kotake et al. | 369/50 |
| 4,757,489 | 7/1988 | Yamagishi | 369/50 |
| 4,815,063 | 3/1989 | Aoshima et al. | 369/50 |
| 4,841,511 | 6/1989 | Suzuki et al. | 369/50 |
| 5,182,741 | 1/1993 | Maeda et al. | 369/50 |
| 5,224,086 | 6/1993 | Wachi | 369/50 |

*Primary Examiner*—Paul W. Huber

[57] ABSTRACT

A rate-variable optical disc recording method and apparatus which is suitable for varying a rate at which a user information is recorded on an optical disc pre-formatted by a user support information. The method and apparatus detects a first predetermined period of first frequency signal for dividing a track of the optical disc into a predetermined size of unit regions from the optical disc pre-formatted by the first frequency signal, generates a second predetermined period of second frequency signal adaptively changing in response to a period variation in the first frequency signal, and records a user information from an information source on the optical disc by synchronizing it with the second frequency signal. Further, the method and apparatus generates a third frequency signal having a period changed in accordance with a transfer rate of the user information, and compares the first frequency signal with the third frequency signal to control a rotation velocity of the optical disc. A rate control apparatus according to the method and apparatus can shorten the time when the user information is recorded on the optical disc, and can the user information on the optical disc in real time.

12 Claims, 10 Drawing Sheets

10
12
14
SERVO
16
LIGHT CONTROLLER
26
UD BL
28
MOTOR DRIVER
Q
CONTROL
30
Q
CARRIER SIGNAL DETECTOR
18
RECORDING INFO. PROCESSOR
24
N
LK
N
PYre or PYres and PCLK
REF. SIGNAL GENERATOR
22
SUPPORT SIGNAL DECODER
20
PAdd or PAdds
USER INFO. (INFO. SOURCE)
PYre or PYres and PCLK
SCLK and SYref 10
14
16
SERVO
12
86
R/W
88
CONTROL
Q
N
LK
18
CARRIER SIGNAL DETECTOR
20
SUPPORT SIGNAL DECODER
22
REF. SIGNAL GENERATOR
82
1ST MOTOR DRIVER
84
2ND MOTOR DRIVER
PCLK,PYre or PYres
SYref
SYref or SCLK
PAdd or PAdds
80
REPRODUCING SIGNAL PROCESSOR
REPRODUCING SIGNAL
UD
BL
26
LIGHT CONTROLLER
24
RECORDING INFO. PROCESSOR
USER INFO. (INFO. SOURCE)

SYref or PYres
SYrefs
$CMW_2$

SYref or PYres
SYrefs
$CMW_2$

SYref or PYres
SYrefs
$CMW_2$

OPTICAL DISC RECORDING METHOD AND APPARATUS WITH VARIABLE SPEED CONTROL FUNCTION

BACKGROUND OF THE INVENTION

1. Field of the Invention

This invention relates to an optical disc driving technique for optically accessing an optical disc, and more particularly to a rate-variable optical disc recording method and apparatus that can vary a rate at which data is recorded onto the optical disc. Also this invention is directed to a rate-variable optical disc reproducing method and apparatus that can vary a rate at which data is reproduced from the optical disc.

2. Description of Prior Art

Generally, in order to record and reproduce an information on and from an optical disc accurately, a disc recording/reproducing apparatus must accurately recognize a position to be accessed and a driving condition in an optical disc. To this end, the optical disc is pre-formatted by a support information including a support synchronous signal for dividing a recording area, that is, track of the optical disc into a certain size of unit recording regions called “frames” or “sectors”, hereinafter referred to as “frame” and a support address for indicating a position of each frame divided by the support synchronous signal. This support synchronous signal included in the support information serves to indicate a rotation velocity of the optical disc, that is, a playing speed of the track besides a function of dividing the track into frames. In other words, the support synchronous signal reports to the optical disc recording/reproducing apparatus a rate at which an information is recorded onto the optical disc as well as a rate at which an information is reproduced from the optical disc. Further, the support information may include a support clock for subdividing the recording unit regions. This support clock is a so-called “bi-phase clock” which is used to modulate a support synchronous signal, a support address and the like, and which is capable of indicating the rotating velocity of the optical disc more accurately compared with the support synchronous signal. In other words, the support clock can more accurately indicate a rate at which an information is recorded onto the optical disc and a rate at which an information is reproduced from the optical disc.

A disc recording/reproducing apparatus for recording and reproducing such an optical disc transfers an information to the optical disc at a constant rate and processes an information from the optical disc at a constant rate. In other words, a transfer rate of an information delivered between the disc recording/reproducing apparatus and the optical disc is fixed constantly. Accordingly, the disc recording/reproducing apparatus must drive a rotating velocity of the optical disc, that is, a playing speed of the track at a predetermined rate. To this end, the disc recording/reproducing apparatus performs the recording/reproducing operation of the information while monitoring if the optical disc, that is, the track is being rotated(or played) at a constant speed, based on a support information detected from the optical disc, that is, a support synchronous signal and/or a support clock. By means of such a disc recording/reproducing apparatus, an information is recorded or reproduced in a frame unit.

Meanwhile, various information, such as text data, audio data and video data, etc., is provided to a user of the disc recording/reproducing apparatus. Each of the various information is transferred at a very different transfer rate in accordance with the attribution and/or the composing system thereof. For example, the audio data is transferred at a very slow rate compared with the video data. Further, in the video data, analog broadcasting video data is transferred more slowly than digital broadcasting video data. Moreover, in the digital broadcasting video data, compressed image data is transferred more slowly than reference image data. A user utilizing various information different in the transfer rate as describe above desires that the various information should be recorded on the optical disc. Accordingly, the disc recording/reproducing apparatus requires a capability of recording various information in the transfer rate on the optical disc.

The disc recording/reproducing apparatus has to be able to accumulate an information from an information source temporarily in order to record on the optical disc various information having a transfer rate different from its own transfer rate. For example, in the case where an information more slow than the disc recording/reproducing apparatus in the transfer rate is inputted, the disc recording/reproducing apparatus must temporarily store the information until an information amount corresponding to the frame is inputted. Also, the disc driver must stop the recording operation until an information amount corresponding to the frame is accumulated. In other words, the recording operation in the disc driver must be periodically stopped. On the other hand, in the case where an information faster than the disc recording/reproducing apparatus in the transfer rate, the disc recording/reproducing apparatus must temporarily store an information exceeding an amount according to the frame. In this case, the disc recording/reproducing apparatus continues to perform after an input of the information is terminated in order to record the exceeding information.

As described above, in order to record a different rate of various information using the disc recording/reproducing apparatus, a buffer for temporarily storing the information is not only required, but also its recording operation is periodically stopped or be continued after an input of the information is terminated. In other words, the disc recording/reproducing apparatus can record an information having a transfer rate different from its own transfer rate on the optical disc in real time. The recording speed of the disc recording/reproducing apparatus, therefore, must be variable in accordance with a transfer rate of the information supplied to thereto.

SUMMARY OF THE INVENTION

Accordingly, it is an object of the present invention to provide a variable-rate optical disc recording method and apparatus that is adapted to vary a rate at which an information is recorded onto the optical disc.

Another object of the present invention is to provide a variable-rate optical disc recording/reproducing apparatus that is adapted to vary a rate at which an information is recorded onto the optical disc.

In order to achieve these and other objects, a rate-variable optical disc recording method according to one aspect of the present invention includes the steps of detecting a first predetermined period of first frequency signal for dividing a track of an optical disc into unit regions having a predetermined size from the optical disc, the first frequency signal being pre-formatted on the optical disc, generating a second predetermined period of second frequency signal adaptively changing in response to a variation in the period of the first frequency signal, recording a user information supplied from a information source on the optical disc by synchronizing the user information with the second frequency signal, generating a third frequency signal having a period changed in accordance to a transfer rate of the user information supplied from the information source, and comparing the first frequency signal with the third frequency signal to control a rotation velocity of the optical disc.

A rate-variable optical disc recording method according to another aspect of the present invention includes the steps of detecting a first predetermined period of first frequency signal for dividing a track of an optical disc into unit regions having a predetermined size and a second predetermined period of second frequency signal for subdividing each of the unit regions into subdivided regions from the optical disc, the first and second frequency signals being pre-formatted on the optical disc, generating a third predetermined period of third frequency signal adaptively changing in response to a variation in the period of any one side of the first and second frequency signals, recording a user information supplied from a information source on the optical disc by synchronizing the user information with the third frequency signal, generating a fourth frequency signal having a period changed in accordance to a transfer rate of the user information supplied from the information source, and comparing any one of the first and second frequency signals with the fourth frequency signal to control a rotation velocity of the optical disc.

A rate-variable optical disc reproducing method according to still another aspect of the present invention includes the steps of inputting a rate of a user information to be reproduced from an optical disc, the user information being recorded on a track of the optical disc along with a first predetermined period of first frequency signal for dividing the track of the optical disc into unit regions having a predetermined size, generating a second frequency signal having a period changed in accordance with the rate of the user information, reproducing the first frequency signal and the user information from the track of the optical disc, and comparing the first frequency signal with the second frequency signal to control a rotation velocity of the optical disc.

A rate-variable optical disc recording apparatus according to still another aspect of the present invention includes means for detecting a first predetermined period of first frequency signal for dividing a track of an optical disc into unit regions having a predetermined size from the optical disc, the first frequency signal being pre-formatted on the optical disc, first frequency signal generating means for generating a second predetermined period of second frequency signal adaptively changing in response to a variation in the period of the first frequency signal from the detecting means, means for recording a user information supplied from a information source on the optical disc by synchronizing the user information with the second frequency signal from the first frequency signal generating means, second frequency signal generating means for generating a third frequency signal having a period changed in accordance to a transfer rate of the user information supplied from the information source to the recording means, and means for comparing the first frequency signal with the third frequency signal to control a rotation velocity of the optical disc.

A rate-variable optical disc recording apparatus according to still another aspect of the present invention includes means for detecting a first predetermined period of first frequency signal for dividing a track of an optical disc into unit regions having a predetermined size and a second predetermined period of second frequency signal for subdividing each of the unit regions into subdivided regions from the optical disc, the first and second frequency signals being pre-formatted on the optical disc, first frequency signal generating means for generating a third predetermined period of third frequency signal adaptively changing in response to a period variation in any one of the first and second frequency signals from the detecting means, means for recording a user information supplied from a information source on the optical disc by synchronizing the user information with the third frequency signal from the first frequency signal generating means, second frequency signal generating means for generating a fourth frequency signal having a period changed in accordance to a transfer rate of the user information supplied from the information source, and means for comparing any one of the first and second frequency signals from the detecting means with the fourth frequency signal from the second frequency signal generating means to control a rotation velocity of the optical disc.

A rate-variable optical disc reproducing apparatus according to still another aspect of the present invention includes means for inputting a rate of a user information to be reproduced from an optical disc, the user information being recorded on a track of the optical disc along with a first predetermined period of first frequency signal for dividing the track of the optical disc into unit regions having a predetermined size, frequency signal generating means for generating a second frequency signal having a period changed in accordance with the rate of the user information, means for reproducing the first frequency signal and the user information from the track of the optical disc, and means for comparing the first frequency signal from the reproducing means with the second frequency signal from the frequency signal generating means to control a rotation velocity of the optical disc.

BRIEF DESCRIPTION OF THE DRAWINGS

The above and other objects and features of the present invention will become more apparent from the following description taken in connection with the accompanying drawings, in which.

DETAILED DESCRIPTION OF THE PREFERRED EMBODIMENT

Figure 1:
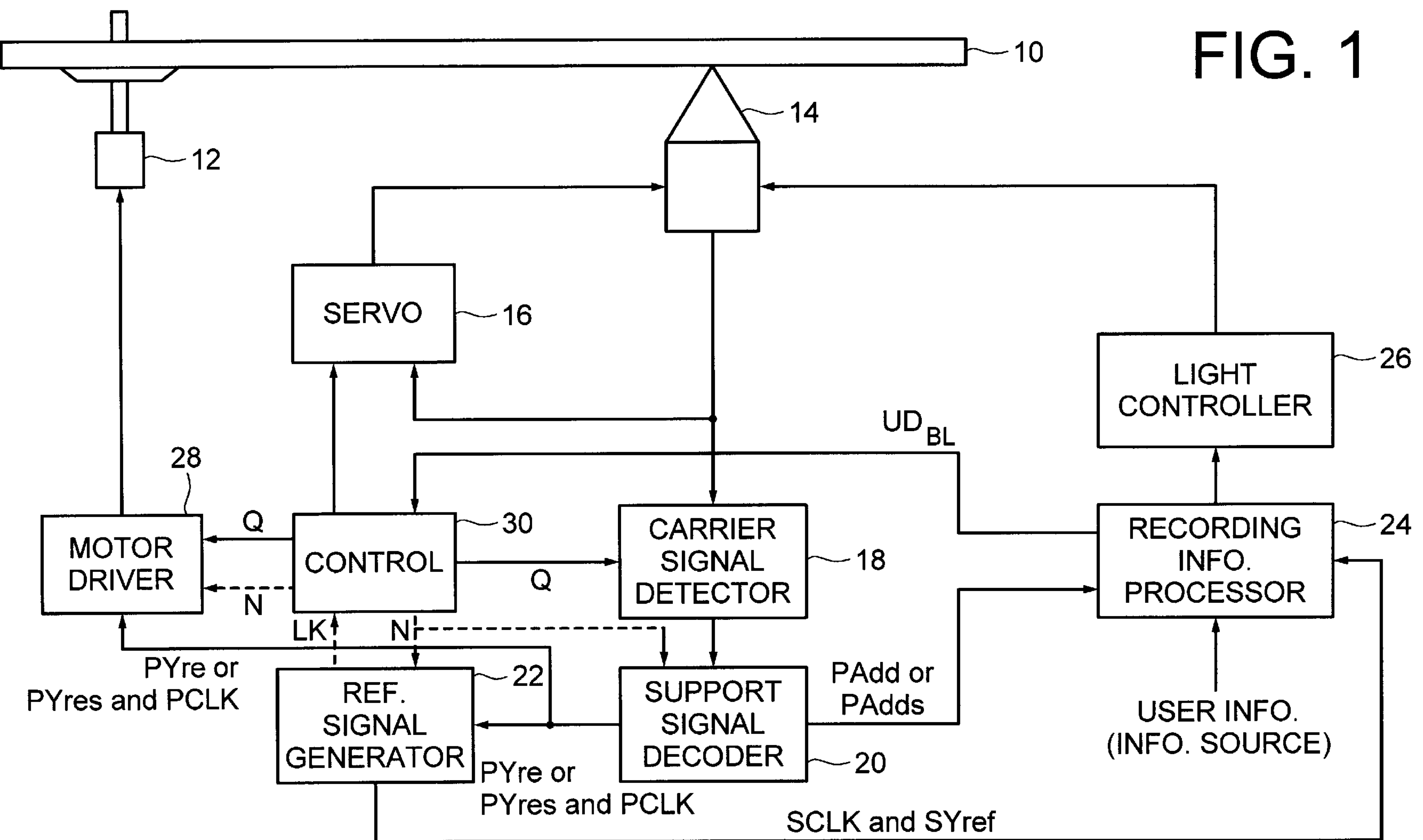
FIG. 1 is a schematic block diagram showing a configuration of an optical disc recording apparatus according to an embodiment of the present invention.

Referring to FIG. 1, there is shown a rate-variable optical disc recording apparatus according to an embodiment of the present invention that includes a spindle motor 12 for rotating an optical disc 10, and a servo portion 16 connected to an optical pickup 14. In the optical disc 10, land and groove tracks, not shown, are formed in parallel in such a manner to make a concentric or spiral shape, and wobble portions, not shown, wobbled in a certain range of period are defined in all of or any one side of two boundary sides in which the land and groove tracks are adjacent to each other. These wobbled portions are pre-formatted by a support information including a synchronous signal PYre, a support identification code PID and a support clock PCLK called "bi-phase clock". The optical pickup 14 irradiates a single main light beam MB onto and two support light beams $SB_1$ and $SB_2$ onto the land and groove tracks of the optical disc 10, thereby recording a user data by the main light beam MB and reading out a support information by the support light beams $SB_1$ and $SB_2$. The optical pickup 14 converts the two support light beams $SB_1$ and $SB_2$ reflected by the optical disc 10 into an electrical signal to generate the first and second radio frequency signals. The servo portion 16 controls the size and position of light beams MB, $SB_1$ and $SB_2$ irradiated onto the land or groove track of the optical disc 10 based on the first and second radio frequency signals from the optical pickup 14.

The rate-variable optical disc recording apparatus further includes a carrier signal detector 18 and a support signal decoder 20 that are connected to the optical pickup 14 in serial. The carrier signal detector 18 filters the first and second radio frequency signals from the optical pickup 14 and adds the filtered radio frequency signals, thereby detecting a carrier signal Pc pre-formatted in the wobbled portion of the optical disc 10. The frequency of the carrier signal detected by the carrier signal detector 18 is shifted depending upon the recording speed of information, that is, the rotation velocity of the optical disc. In order to accurately detect the carrier signal in which its frequency is shifted in accordance with the recording speed, the carrier signal detector 18 shifts a filtering frequency band in accordance with a value of recording speed information Q. The support signal decoder 20 reconstructs the synchronous signal PYre, the bi-phase clock PCLK and the support identification code PID from the carrier signal Pc from the carrier signal detector 18 and at the same time decodes a support address PAdd included in the support identification code PID. Further, the support signal decoder 20 may produce the second support synchronous signal PYres for subdividing the frame divided by the support synchronous signal PYre into at least two sub-frames and the second support address PAdds for indicating a physical position of each sub-frame. A region between the support synchronous signal PYre, that is, the number of sub-frames included in a single frame is determined by a region dividing information N supplied from a control 30 to the support signal decoder 20. The frequencies of the support synchronous signal PYre, the second support synchronous signal PYres and the bi-phase clock PCLK are shifted in accordance with a variation in the rotation velocity of the optical disc, that is, in the playing speed of the land and groove tracks.

Moreover, the optical disc recording apparatus further includes a reference signal generator 22 for generating a reference synchronous signal SYref and a reference clock SCLK, and a light controller 26 connected between a recording information processor 24 and the optical pickup 14. The reference signal generator 22 applies the support synchronous signal PYre or the second support synchronous signal PYres from the support signal decoder 20 to the recording information processor 24 as a reference synchronous signal SYref. Also, the reference signal generator 22 frequency-multiplies the bi-phase clock PCLK from the support signal decoder 20 by a constant multiplication ratio and applies the multiplied signal to the recording information processor 24 as the reference clock SCLK. The frequencies of these reference synchronous signal SYref and reference clock SCLK are shifted in accordance with a variation in the rotation velocity of the optical disc 10, that is, the playing speed of the land and groove tracks like the frequencies of the support synchronous signal PYre, the second support synchronous signal PYres and the bi-phase clock PCLK. Otherwise, the reference signal generator 22 may inputs the region dividing information N additionally, and may frequency-multiplies the bi-phase clock PCLK by a multiplication ratio according to a value of the region dividing information N. In other words, the reference signal generator 22 may control a frequency ratio of the reference clock SCLK to the bi-phase clock PCLK in accordance to the region dividing information. More specifically, the reference clock SCLK has M times the frequency compared with the bi-phase clock PCLK when the region dividing information N is "1"; while it has M×N times the frequency compared with the bi-phase clock PCLK when the region dividing information N is more than "1".

Next, the recording information processor 24 combines the reference synchronous signal SYref from the reference signal generator 22 with the support address PAdd from the support signal decoder 20 to produce a frame header FH, and simultaneously make a block of a user information the information source into a certain size of user information blocks UDB. The recording information processor 24 generates user information frames UDF by adding the user information block UDB to the frame header FH. The user information frame UDF generated at the recording information processor 24 in this manner is transferred to the light controller 26 in conformity to the reference clock SCLK. Then, the light controller 26 allows the user information frame UDF to be recorded on a position, that is, a frame in land or groove track of the optical disc assigned by the support address PAdd by switching the main light beam MB generated at the optical pickup 14 in accordance with a logical value of an output signal of the recording information processor 24. Accordingly, a rate in which a user information is recorded on the optical disc 10, changes in accordance with a rate in which the land and groove tracks is played. Otherwise, the recording information processor 24 may generate the user information frame UDF adding the second support address PAdds instead of the support address PAdd, and may transfer the user information frame UDF to the light controller in conformity to the reference clock SCLK generated at the reference clock generator 22. The reference clock SCLK in this case has N time the frequency compared with the case where the support address PAdd is included in the user information frame UDF. The light controller 26 switching a main light beam MB in accordance with a logical value of an output signal of the recording information processor 24 records the user information frame UDF on a position of the land or groove in the optical disc 10, that is, on a sub-frame. Accordingly, N number of user information frames UDF is recorded on the frame in the land and groove track specified by the support synchronous signal PYre. Therefore, a recording capacity of the optical disc 10 increase N times. Also, a rate at which the user information is recorded on the optical disc 10 varies in accordance with a playing speed of the land and groove tracks.

The rate-variable optical recording apparatus further includes a motor driver 28 among the spindle motor 12, the support signal decoder 20 and the control 30. The motor driver 28 varies a rotation speed of the spindle motor 12 in such a manner that the track of the optical disc 10 at a constant rate corresponding to a recording rate information Q from the control 30. To this end, the motor driver 28 controls the rotation speed of the spindle motor 12 by utilizing the recording rate information Q from the control 30 and the support synchronous signal PYre or the bi-phase clock PCLK. Otherwise, the second support synchronous signal PYres instead of the support synchronous signal PYre and the bi-phase clock PCLK may be inputted to the motor driver 28. In this case, the motor driver 28 controls the spindle speed of the spindle motor 12 by utilizing the region dividing information N supplied from the control 30 along with the recording rate information Q and the second support synchronous signal PYres. The control 30 supplies a reference data concerning the position of the optical pickup 14 and the position and size of light beam, etc. Also, the control 30 supplies the region diving information N to the support signal decoder 20, the reference signal generator 22 and the motor driver 28 when intending to divide the frame specified by the support synchronous signal PYre into at least two sub-frames. Further, the control 30 receives a speed information $UD_{BL}$ on the transfer rate of the user information supplied to the recording information processor 24 from an information source, not shown, from the recording information processor 24. Then, the control 30 calculates a recording rate corresponding to a transfer rate of the user information by the speed information $UD_{BL}$ and supplies the recording rate information Q to the carrier signal detector 18 and the motor driver 28.

Figure 2:
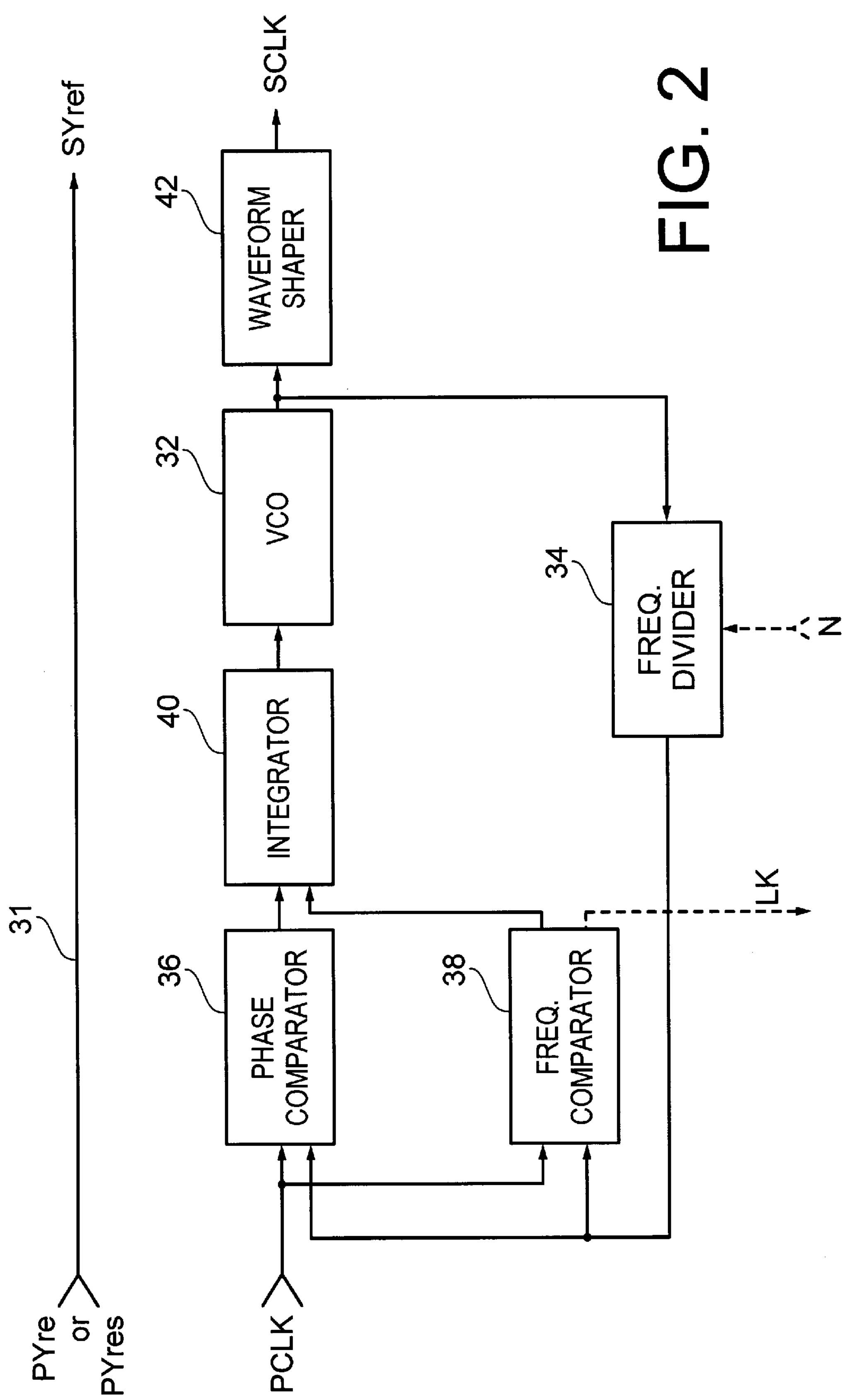
FIG. 2 is a detailed block diagram of the reference signal generator shown in FIG. 2.

FIG. 2 is a detailed block diagram of the reference signal generator 32 shown in FIG. 1. As shown in FIG. 2, the reference clock generator 32 includes a transmission line 31 for receiving a support synchronous signal PYre or the second support synchronous signal PYres from the support signal decoder 20 shown in FIG. 1, and a voltage controlled oscillator(VCO) 32, a frequency divider 34, a phase comparator 36, a frequency comparator 38 and an integrator 40 that are connected to form a circular loop. The support synchronous signal PYre or the second support synchronous signal PYres in the transmission line 31 is transferred to the recording information processor 24 as it is, and is used as a reference synchronous signal SYref. Accordingly, the reference synchronous signal SYref applied to the recording information processor 24 has the same phase and frequency as the support synchronous signal PYre or the second support synchronous signal PYres generated at the support signal decoder 20. The frequency divider 34 frequency-divides a sinusoidal signal generated at the VCO 32 by a constant frequency division ratio M (e.g., 4) and applies the frequency-divided sinusoidal signal to the phase comparator 36 and the frequency comparator 38. A bi-phase clock PCLK constructed at the support signal decoder 20 shown in FIG. 1 is commonly inputted to the phase comparator 36 and the frequency comparator 38. The phase comparator 36 compares a phase of the frequency-divided sinusoidal signal from the frequency divider 34 with that of the bi-phase clock PCLk to generate a first voltage signal corresponding to the resultant phase difference. The frequency comparator 38 compares the phase of the frequency-divided sinusoidal signal from the frequency divider 34 with that of the bi-phase clock PCLK to generate a second voltage signal corresponding to the resultant frequency difference. The frequency comparator 38 may generate a locking signal LK for indicating whether the frequency of the divided sinusoidal signal is equal to that of the bi-phase clock PCLK or not. This locking signal LK maintains a specific logic, i.e., high logic, when the frequency of the frequency-divided sinusoidal signal is equal to that of the bi-phase signal PCLK. The control 30 shown in FIG. 1 selectively performs the recording operation by the locking signal LK. Then, the integrator 40 integrates the first voltage signal from the phase comparator 36 and the second voltage signal from the frequency comparator 38, respectively, thereby eliminating a noise signal with a high frequency component. Also, the integrator 40 supplies the VCO 32 with the first and second voltage signals having a noise signal eliminated. The VCO 32 controls the phase and frequency of the sinusoidal signal generated at itself in accordance with the first and second voltages from the integrator 40.

The reference signal generator 22 further includes a waveform shaper 42 for inputting the sinusoidal signal from the VCO 32. This waveform shaper 42 makes a waveform shaping of the sinusoidal signal from the VCO 32 into a shape of rectangular waveform to generates a reference clock SCLK. The reference clock SCLK generated at the waveform shaper 42 is applied to the recording information processor 24 shown in FIG. 1 to control a transfer rate of an information to be supplied from the recording information processor 24 to the light controller 24. As described above, the circular loop including the phase comparator 36 and the frequency comparator 38 varies a period of the reference clock SCLK by a variation amount in a period T of the bi-phase clock PCLK even if the period T of the bi-phase clock PCLK varies, whereby the reference clock SCLK has a period corresponding to "1/M" of the bi-phase clock PCLK. Also, the circular loop changes the phase of the reference clock SCLK by a variation amount in a phase of the bi-phase clock PCLK when the phase of the bi-phase clock PCLK suddenly changes, whereby the reference clock SCLK has the same phase as the bi-phase clock PCLK. Accordingly, the reference clock SCLK always has not only the same phase as the bi-phase clock PCLK, but also it can always maintain M times (e.g., 4 times) the frequency of with the bi-phase clock PCLK.

Otherwise, the frequency divider 34 may divide a sinusoidal signal from the VCO 32 at a frequency division ratio (i.e., M×N) corresponding to the region dividing information N by receiving the region dividing information N from the control shown in FIG. 1. Specifically, the frequency divider 34 makes a frequency division by M (e.g., 4) of the sinusoidal signal from the VCO 32 when the region dividing information N. On the other hand, the frequency divider 34 makes a frequency division by M×N (e.g., 4) of the sinusoidal signal from the VCO 32. Accordingly, the reference clock SCLK generated at the waveform shaper 42 has M×N times the frequency of the bi-phase clock PCLK. A recording rate of the user information recorded on the optical disc 10, therefore, becomes fast by M times and adaptively become changed in accordance with a playing speed of the land and groove tracks.

Figure 3:
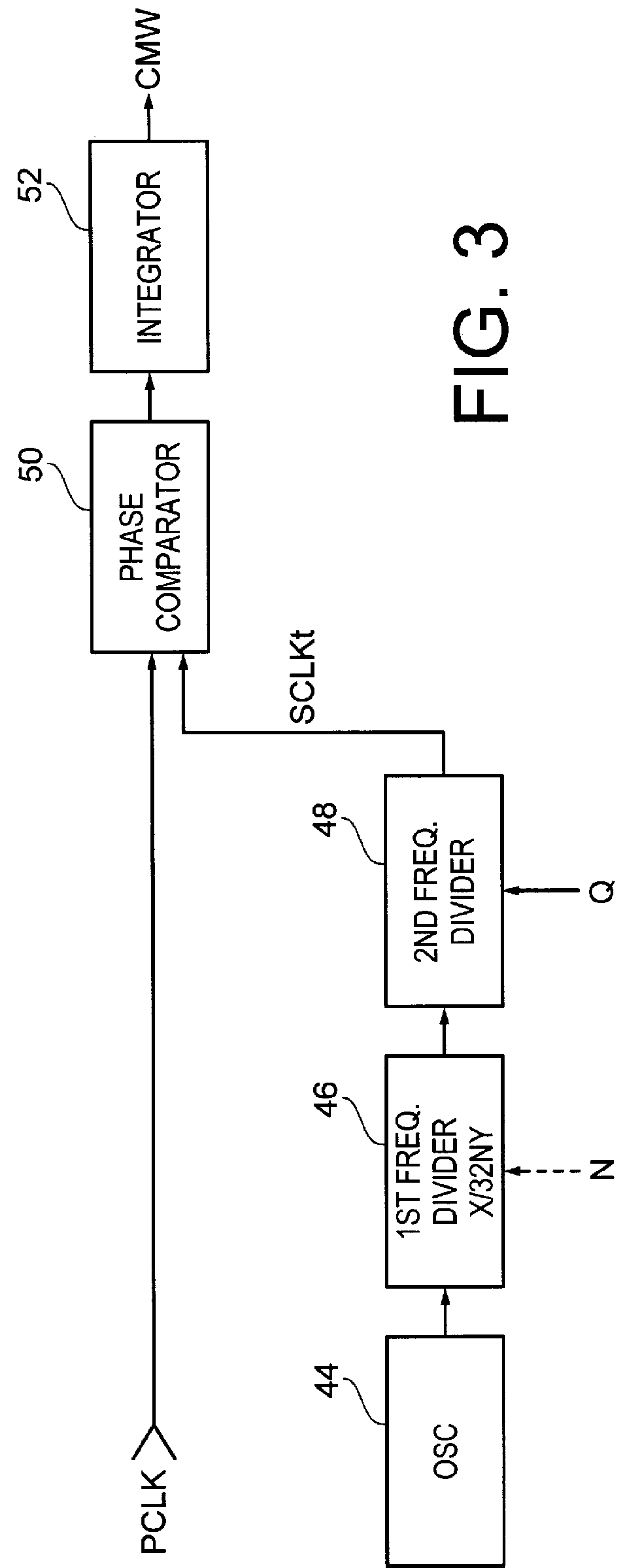
FIG. 3 is a detailed block diagram of the first embodiment of the motor driver shown in FIG. 1.

FIG. 3 is a detailed block diagram of the first embodiment of the motor driver 28 shown in FIG. 1. The motor driver 28 in FIG. 3 varies a rotating velocity of the optical disc 10 when the support signal decoder 20 generates the second synchronous signal PYres and the second support address PAdds from the support information pre-formatted on the optical disc 10, that is, when a user information is recorded on the frame specified by the support synchronous signal PYre at N times the recording density, thereby matching a rate of the user information frame recorded on the optical disc 10 with a transfer rate of the user information supplied from the information source.

As shown in FIG. 3, the motor driver 28 includes first and second frequency dividers 46 and 48 connected to an oscillator 44 in serial. The oscillator 44 generates an oscillating signal having a frequency corresponding to the bit number of an information which is recorded on the frame divided by the support synchronous signal PYre pre-formatted on the optical disc 10 at the time of normal recording. The oscillation signal is a reference clock SCLK used in the normal recording mode, which is hereinafter referred to as "second reference clock". The first frequency divider 46 frequency-divides the second reference clock from the oscillator 44 by a frequency division ratio of "X/(32·N·Y)" to thereby generate a clock signal having a frequency corresponding to 32N times the frequency of the bi-phase clock PCLK reconstructed from the optical disc 10 at the time of normal recording. In the above formula, "X" represents the bit number of a user information recorded on the frame specified by the support synchronous signal PYre at the time of normal recording; "Y" does the number of bi-phase clock PCLK pre-formatted on the frame specified by the support synchronous signal PYre; "N", which is a region dividing information for controlling the recording density, does a ratio of the second support synchronous signal PYres to the support synchronous signal PYre generated by the support signal decoder 20; and "32" does a ratio of the recording rate at the time of normal recording to the adjustable maximum recording rate. The second frequency divider 48 frequency-divides a clock signal from the first frequency divider 46 in accordance with a value of the recording rate information Q from the control 30 shown in FIG. 1 to generate a third reference clock $SCLK_r$ with various frequencies. The third frequency clock $SCLK_r$ has the same frequency as the bi-phase clock PCLK in the normal recording mode or 2, 4, 8, 1/2, 1/4 or 8/1 times the frequency of the bi-phase clock PCLK in the normal recording mode in accordance with a value of the recording rate information Q. Accordingly, the second frequency divider 48 frequency-divides the clock signal from the first frequency divider 46 by 32 when the recording rate information Q is "1", and thus generates a the third reference clock $SCLK_r$ having the same frequency as the bi-phase clock PCLK at the time of normal recording. When the recording rate information Q is "2", "4" or "8", the second frequency divider 48 frequency-divides the clock signal from the first frequency divider 46 by 16, 8 or 4, respectively, thereby generating the third reference clock $SCLK_r$ having 2, 4 or 8 times the frequency of the bi-phase clock PCLK at the time of normal recording. When the recording rate information Q is "1/2", "1/4" or "1/8", the second frequency divider 48 frequency-divides the clock signal from the first frequency divider 46 by 64, 128 or 256, respectively, thereby generating the third reference clock $SCLK_r$ having the 1/2, 1/4 or 1/8 times the frequency of the bi-phase clock PCLK at the time of normal recording. The frequency of the third reference clock $SCLK_r$ varying as described above assigns the playing speed of the track of the optical disc 10 and simultaneously the rate of the user information recorded on the optical disc 10.

Moreover, the motor driver 28 further includes a phase comparator 50 for receiving the bi-phase clock PCLK from the support signal decoder 20 shown in FIG. 1 and the third reference clock $SCLK_r$ from the second frequency divider 48, and an integrator 52 connected to the phase comparator 50. The phase comparator 50 compares the phase of the bi-phase clock PCLK with that of the third reference clock $SCLK_r$ to detect a phase difference and a sequence relationship in the phase. The phase comparator 50 generates a phase error voltage signal $\Delta V$ having a positive(+) or negative(−) sign and a size corresponding to a phase difference $\Delta\phi$ in accordance with the sequence relationship, that is, the advance and lag in the phase.

Figure 4A:
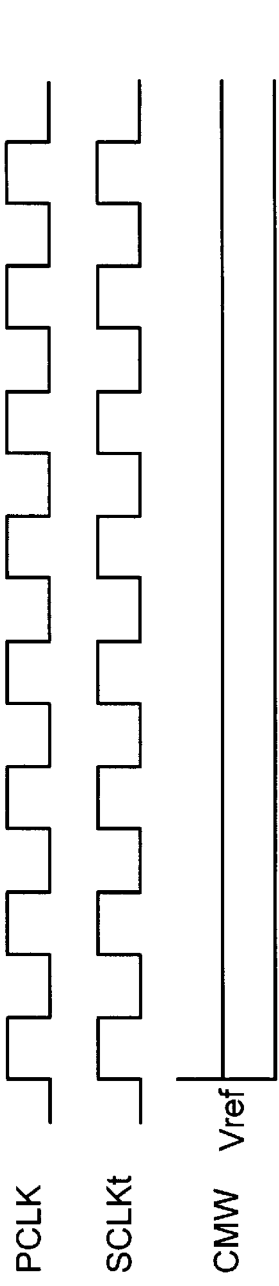
FIG. 4 is a operational waveform diagram of each part of the circuit shown in FIG. 3.
Figure 4B:
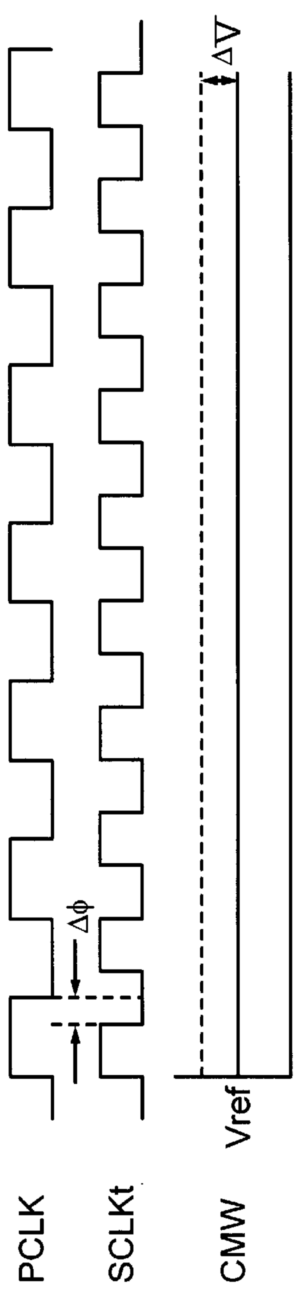
Figure 4C:
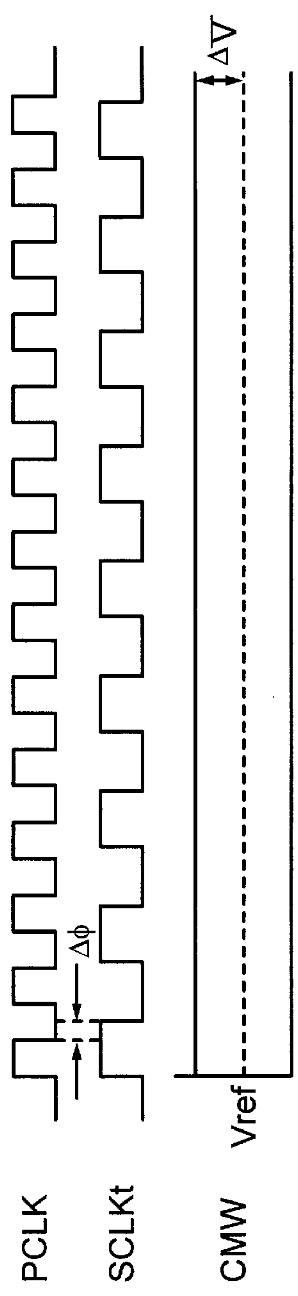

The integrator 52 integrates the phase error voltage signal $\Delta V$ from the phase comparator 50, thereby generating a motor driving voltage signal CMW which adds and subtracts the phase error voltage signal $\Delta V$ to and from the previously integrated voltage Vref. As shown in FIG. 4(A), this motor driving voltage signal CMW becomes identical to the previously integrated voltage Vref when the phase of the bi-phase clock PCLK is equal to that of the third reference clock $SCLK_r$. As shown in FIG. 4(B), the motor driving voltage signal CMW has a lower voltage than the previously integrated voltage Vref by $\Delta V$ when the phase of the bi-phase clock PCLK is more advanced than that of the third reference clock by $\Delta\phi$. On the other hand, as shown in FIG. 4(C), the motor driving voltage signal CMW maintains a higher voltage than the previously integrated voltage Vref by, $\Delta V$ when the phase of the bi-phase clock PCLK is more lagged than that of the third reference clock by $\Delta\phi$. The motor driving voltage CMW generated at the integrator 52 is applied to the spindle motor 12 shown in FIG. 1 to control the rotation speed of the spindle motor 12 and the rotation velocity of the optical disc 10.

As described above, the motor driving voltage signal CMW maintains a constant voltage when the phase of the bi-phase clock PCLK is equal to that of the third reference clock $SCLK_r$, after it varies until the bi-phase clock PCLK has the same phase as the third reference clock $SCLK_r$. Accordingly, the track of the optical disc plays at a variable velocity based on the frequency of the third reference clock $SCLK_r$.

Figure 5:
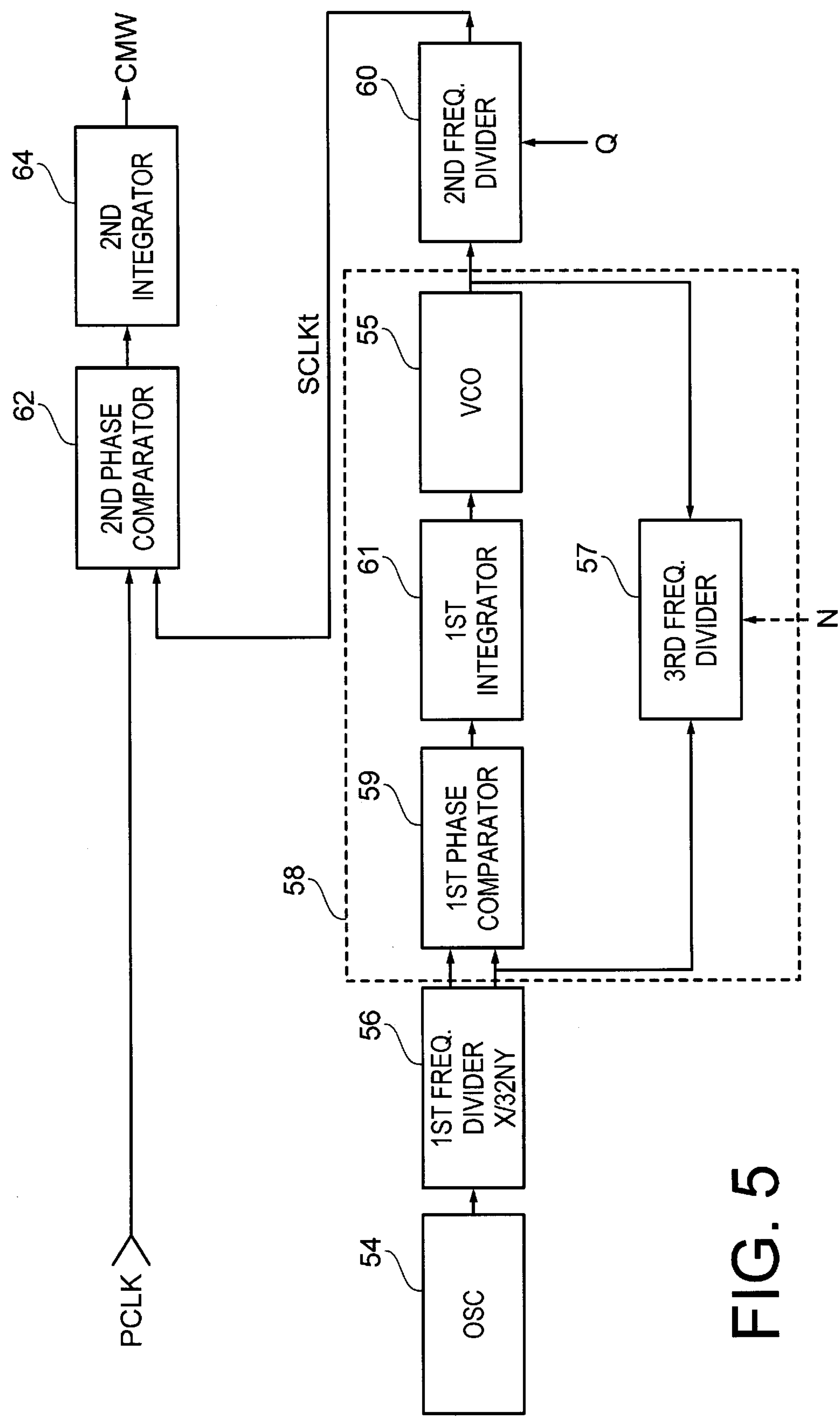
FIG. 5 is a detailed block diagram of the second embodiment of the motor driver shown in FIG. 1.

FIG. 5 is a detailed block diagram of the second embodiment of the motor driver 28 shown in FIG. 1. The motor driver 28 varies the rotation velocity of the optical disc 10, that is, the playing speed of the track when the frequency division ratio "X/(32·N·Y)" of the first frequency divider 46 shown in FIG. 3 is not an integer, thereby varying a recording rate of user information.

As shown in FIG. 5, the motor driver 28 includes a first frequency divider 56, a multiplier 58 and a second frequency divider 60 that are connected to an oscillator 54 in serial. The oscillator 54 generates the second reference clock having a frequency corresponding to the bit number of an information which is recorded on the frame divided by the support synchronous signal PYre pre-formatted on the optical disc 10 at the time of normal recording.

The first frequency divider 56 frequency-divides the second reference clock from the oscillator 54 by a frequency division ratio of "X/(32·Y)" to thereby generate a clock signal having a frequency corresponding to 32N times the frequency of the bi-phase clock PCLK reconstructed from the optical disc 10 at the time of normal recording. In the above formula, "X" represents the bit number of a user data recorded on the frame specified by the support synchronous signal PYre at the time of normal recording; "Y" does the number of bi-phase clock PCLK pre-formatted on the frame specified by the support synchronous signal PYre; and "32" does a ratio of the recording rate at the time of normal recording to the adjustable maximum recording rate. These "X", "Y" and "32" are set to the first frequency divider 56 by a manufacturer.

The multiplier 58 makes a frequency multiplication of the clock signal from the first frequency divider 56 into a value of the region dividing information N from the control 30 shown in FIG. 30 to thereby generate a clock signal having a frequency corresponding to 32N times the frequency of the bi-phase clock PCLK constructed from the optical disc 10 at the time of normal recording. To this end, the multiplier 58 consists of a voltage controlled oscillator(VCO) 55, a third frequency divider 57, a first phase comparator 59 and a first integrator 61 that are connected to form a circular loop between the first frequency divider 56 and the second frequency divider 60. The third frequency divider 57 frequency-divides a clock signal generated at the VCO 56 by a value of the region dividing information N and supplies the N frequency-divided clock signal to the first phase comparator 59. The region dividing information N is to control the recording density, and which is a frequency ratio of the second support synchronous signal PYres generated by the support signal decoder 20 to the support synchronous signal PYre. The first phase comparator 59 compares the phase of the clock signal from the first frequency divider 56 with that of the N frequency-divided clock signal from the third frequency divider 57 to thereby generate a phase error voltage signal based on the sequence relationship in the phase and the phase difference therebetween. The first integrator 61 integrates the phase error voltage signal from the phase comparator 59 to generate a control voltage signal. This control voltage signal has a voltage level higher or lower than the previous voltage level by an absolute value of the phase error voltage signal. Then, the VCO 55 controls a frequency of the clock signal in accordance with the control voltage signal from the first frequency divider 56, thereby generating a clock signal having a N times higher frequency than the clock signal generated at the first frequency divider 56, that is, a frequency corresponding 32N times the frequency of the bi-phase clock PCLK included in the frame divided by the support synchronous signal PYre.

The second frequency divider 60 frequency-divides a clock signal from the VCO 55 within the multiplier 58 in accordance with a value of the recording rate information Q from the control 30 shown in FIG. 1 to generate a third reference clock $SCLK_t$ with various frequencies. The third reference clock $SCLK_t$ has the same frequency as; or 2, 4, 8, 1/2, 1/4 or 8/1 times the frequency of the bi-phase clock PCLK reconstructed from the optical disc 10 at the time of normal recording in accordance with a value of the recording rate information Q. Accordingly, the second frequency divider 60 frequency-divides the clock signal from the multiplier 58 by 32 when the recording rate information Q is "1", and thus generates the third reference clock $SCLK_t$ having the same frequency as the bi-phase clock PCLK at the time of normal recording. When the recording rate information Q is "2", "4" or "8", the second frequency divider 60 frequency-divides the clock signal from the multiplier 58 by 16, 8 or 4, respectively, thereby generating the third reference clock $SCLK_t$ having 2, 4 or 8 times the frequency of the bi-phase clock PCLK at the time of normal recording. When the recording rate information Q is "1/2", "1/4" or "1/8", the second frequency divider 60 frequency-divides the clock signal from the multiplier 58 by 64, 128 or 256, respectively, thereby generating the third reference clock $SCLK_t$ having the 1/2, 1/4 or 1/8 times the frequency of the bi-phase clock PCLK at the time of normal recording, respectively. The frequency of the third reference clock $SCLK_t$ varying as described above assigns a playing speed of the track of the optical disc 10 and simultaneously a rate of the user information recorded on the optical disc 10.

Moreover, the motor driver 28 further includes a second phase comparator 62 for receiving the bi-phase clock PCLK from the support signal decoder 20 shown in FIG. 1 and the third reference clock $SCLK_t$ from the second frequency divider 60, and a second integrator 64 connected to the second phase comparator 62. The second phase comparator 62 compares the phase of the bi-phase clock PCLK with that of the third reference clock $SCLK_t$ to detect the resultant phase difference and the resultant sequence relationship in the phase. The second phase comparator 62 generates a phase error voltage signal $\Delta V$ having a positive(+) or negative(−) sign and a size corresponding to a phase difference $\Delta\phi$ in accordance with the sequence relationship, that is, the advance and lag in the phase.

The second integrator 64 integrates the phase error voltage signal $\Delta V$ from the second phase comparator 62, thereby generating a motor driving voltage signal CMW which adds and subtracts the phase error voltage signal $\Delta V$ to and from the previously integrated voltage Vref. The motor driving voltage signal CMW generated at the second integrator 64 is applied to the spindle motor 12 shown in FIG. 1 to control the rotation velocity of the optical disc 10.

As described above, the motor driving voltage signal CMW maintains a constant voltage from the time at which the phase of the bi-phase clock PCLK becomes equal to that of the third reference clock $SCLK_t$, after it varies until the bi-phase clock PCLK has the same phase as the third reference clock $SCLK_t$. Accordingly, the track of the optical disc plays at a variable speed based on the frequency of the third reference clock $SCLK_t$.

Figure 6:
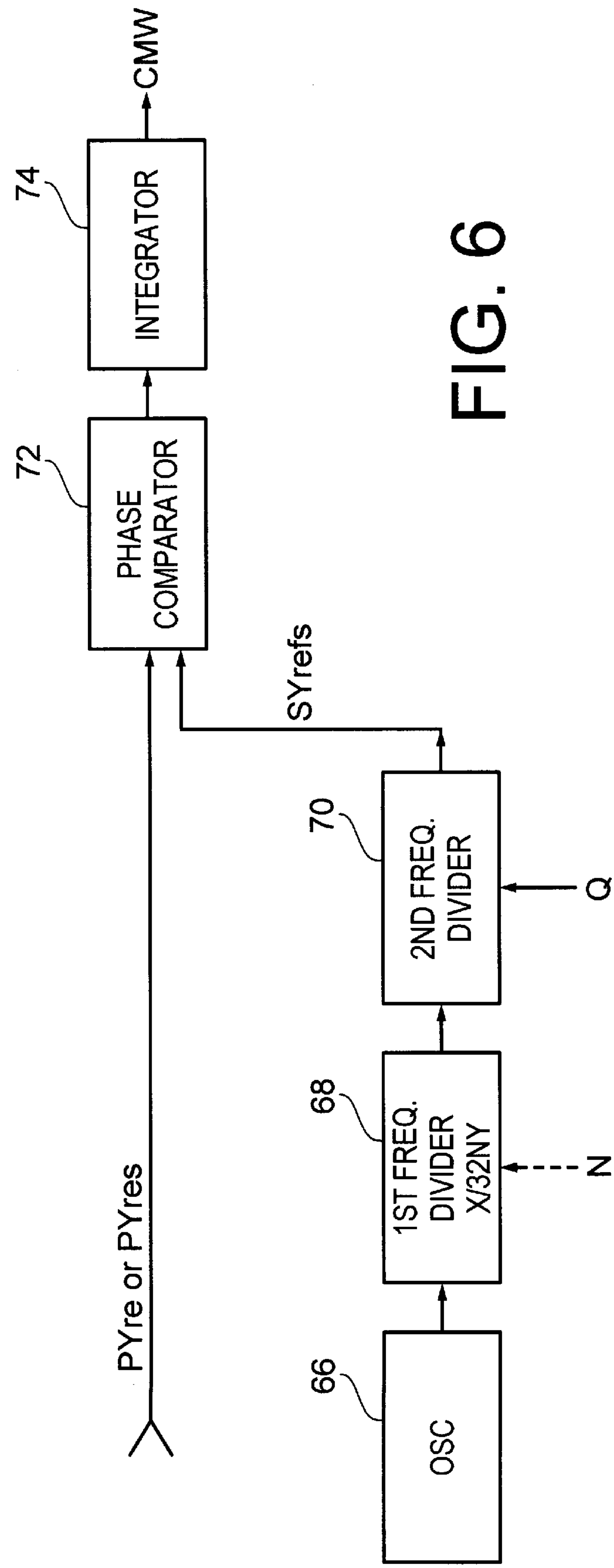
FIG. 6 is a detailed block diagram of the third embodiment of the motor driver shown in FIG. 1.

FIG. 6 is a detailed block diagram of the third embodiment of the motor driver 28 shown in FIG. 1. The motor driver 28 in FIG. 6 controls a rotation velocity of the optical disc by utilizing the support synchronous signal PYre or the second support address PAdds from the support signal decoder 20, thereby matching a rate of the user information frame recorded on the optical disc 10 with a transfer rate of the user information supplied from the information source.

As shown in FIG. 6, the motor driver 28 includes first and second frequency dividers 68 and 70 connected to an oscillator 66 in serial. The oscillator 66 generates a second reference clock having a frequency corresponding to the bit number of an information which is recorded on the frame divided by the support synchronous signal PYre preformatted on the optical disc 10 at the time of normal recording.

The first frequency divider 68 frequency-divides the second reference clock from the oscillator 66 by a frequency division ratio of "X/32" to thereby generate a clock signal having a frequency corresponding to 32 times the frequency of the support synchronous signal PYre reconstructed from the optical disc 10 at the time of normal recording. In the above frequency division ratio, "X" represents the bit number of a user information recorded on the frame specified by the support synchronous signal PYre at the time of normal recording; and "32" does a ratio of the recording rate at the time of normal recording to the adjustable maximum recording rate. These "x" and "32" are set to the first frequency divider 68 by a manufacturer. Otherwise, the first frequency divider 68 may frequency-divide the second reference clock from the oscillator 66 by a frequency division ratio of "X/32N" by utilizing a value of the region dividing information N from the control 30 shown in FIG. 1, to thereby generate a clock signal having a frequency corresponding to 32N times the frequency of the support synchronous signal PYre reconstructed from the optical disc 10 at the time of normal recording, that is, 32 times the frequency of the second support synchronous signal PYres. In the above frequency division ratio, "X" represents the bit number of a user information recorded on the frame specified by the support synchronous signal PYre at the time of normal recording; "N", which is a region dividing information for controlling the recording density, does a ratio of the second support synchronous signal PYres to the support synchronous signal PYre generated by the support signal decoder 20; and "32" does a ratio of the recording rate at the time of normal recording to the adjustable maximum recording rate. The "x" and "32" are set to the first frequency divider 68 by a manufacturer while the "N" is supplied from the control 30 shown in FIG. 1.

The second frequency divider 70 frequency-divides a clock signal from the first frequency divider 68 by a value of the recording rate information Q from the control 30 shown in FIG. 1 to generate a second reference synchronous signal SYrefs with various frequencies. The second reference synchronous signal SYrefs has the same frequency as the support synchronous signal PYre or the second support synchronous signal PYres, or 2, 4, 8, 1/2, 1/4 or 8/1 times the frequency of the synchronous signal PYre or PYres at the time of normal recording in accordance with a value of the recording rate information Q. Accordingly, the second frequency divider 70 frequency-divides the clock signal from the first frequency divider 68 by 32 when the recording rate information Q is "1", and thus generates the second reference synchronous signal SYrefs having the same frequency as the support synchronous signal PYre or the second support synchronous signal PYres at the time of normal recording by controlling a duty cycle of the frequency-divided clock signal. When the recording rate information Q is "2", "4" or "8", the second frequency divider 70 frequency-divides the clock signal from the first frequency divider 46 by 16, 8 or 4, respectively, thereby generating the second reference synchronous signal SYrefs having 2, 4 or 8 times the frequency of the support synchronous signal PYre or the second support synchronous signal PYres at the time of normal recording, respectively, by controlling a duty cycle of the frequency-divided clock signal. When the recording rate information Q is "1/2", "1/4" or "1/8", the second frequency divider 70 frequency-divides the clock signal from the first frequency divider 68 by 64, 128 or 256, respectively, and thus generates the second reference synchronous signal SYrefs having the 1/2, 1/4 or 1/8 times the frequency of the support synchronous signal PYre or the second support synchronous signal PYres at the time of normal recording, respectively, by controlling a duty cycle of the frequency-divided clock signal. The frequency of the second reference synchronous signal SYrefs varying as described above assigns a playing speed of the track of the optical disc 10 and simultaneously a rate of the user information recorded on the optical disc 10.

Moreover, the motor driver 28 further includes a phase comparator 72 for receiving the support synchronous signal PYre or the second support synchronous signal PYres from the support signal decoder 20 shown in FIG. 1 and the second reference synchronous signal SYrefs from the second frequency divider 70, and an integrator 74 connected to the phase comparator 72. The phase comparator 72 compares the phase of the support synchronous signal PYre or the second support synchronous signal PYres with that of the second reference synchronous signal SYrefs to detect the phase difference and the sequence relationship in the phase. The phase comparator 72 generates a phase error voltage signal $\Delta V$ having a positive(+) or negative(−) sign and a size corresponding to a phase difference $\Delta\phi$ in accordance with the sequence relationship, that is, the advance and lag in the phase.

Figures 7A, 7B, 7C:
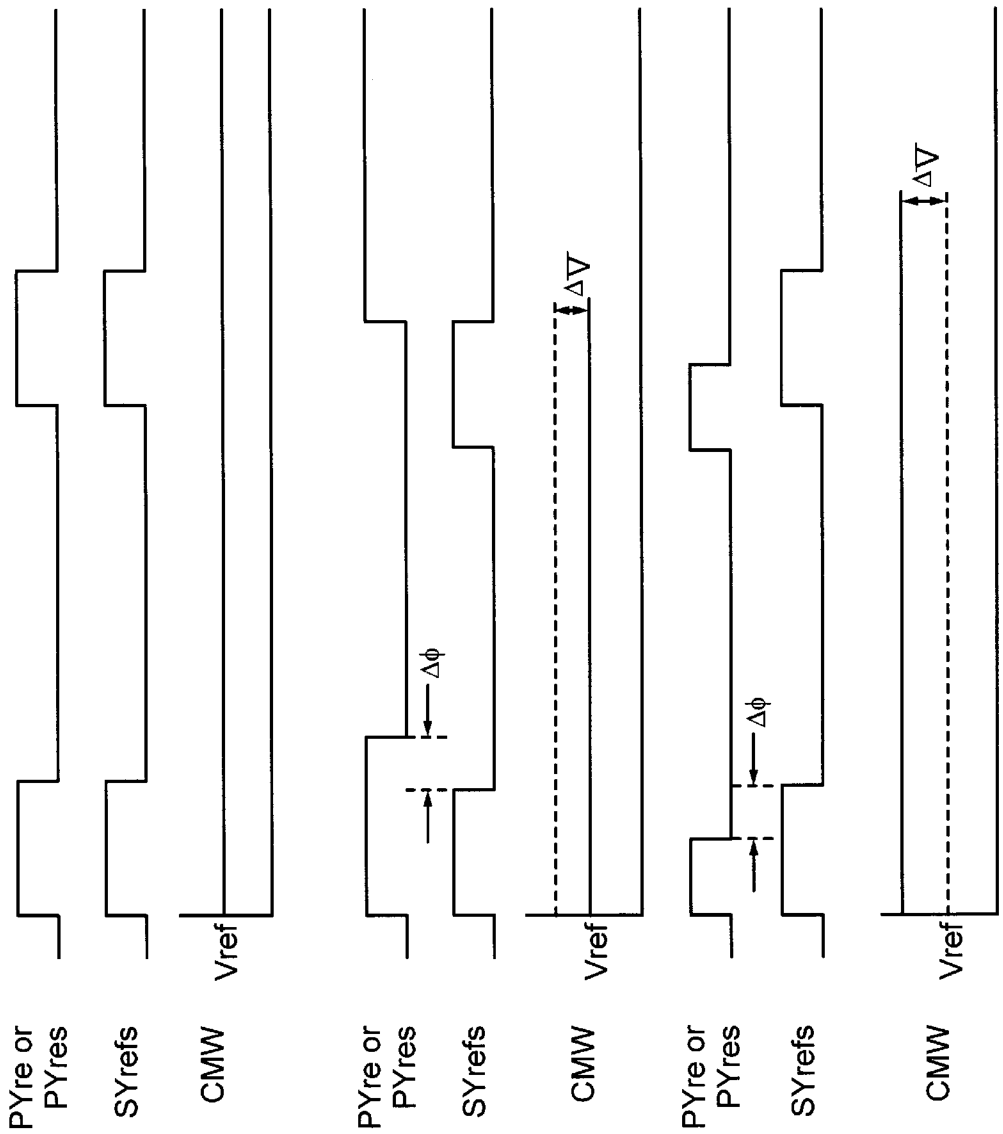
FIG. 7 is an operational waveform diagram of each part of the circuit shown in FIG. 6.

The integrator 74 integrates the phase error voltage signal $\Delta V$ from the phase comparator 50, thereby generating a motor driving voltage signal CMW which adds and subtracts the phase error voltage signal $\Delta V$ to and from the previously integrated voltage Vref. As shown in FIG. 7(A), this motor driving voltage signal CMW has the previously integrated voltage Vref when the phase of the support synchronous signal PYre or the second support synchronous signal PYres is equal to that of the second reference synchronous signal SYrefs. As shown in FIG. 7(B), the motor driving voltage signal CMW has a lower voltage than the previously integrated voltage Vref by $\Delta V$ when the phase of the support synchronous signal PYre or the second support synchronous signal PYres is more advanced than that of the second reference synchronous signal SYrefs by $\Delta\phi$. On the other hand, as shown in FIG. 7(C), the motor driving voltage signal CMW maintains a higher voltage than the previously integrated voltage Vref by $\Delta V$ when the phase of the support synchronous signal PYre or the second support synchronous signal PYres is more lagged than that of the second reference synchronous signal SYrefs by $\Delta\phi$. The motor driving voltage CMW generated at the integrator 74 is applied to the spindle motor 12 shown in FIG. 1 to control the rotation velocity of the optical disc 10.

As described above, the motor driving voltage signal CMW maintains a constant voltage from the time at which the phase of the support synchronous signal PYre or the second support synchronous signal PYres becomes equal to that of the second reference synchronous signal SYrefs, after it varies until the support synchronous signal PYre or the second support synchronous signal PYres has the same phase as the second reference synchronous signal SYrefs. Accordingly, the track of the optical disc plays at a variable velocity based on the frequency of the second reference synchronous signal SYrefs.

Figure 8:
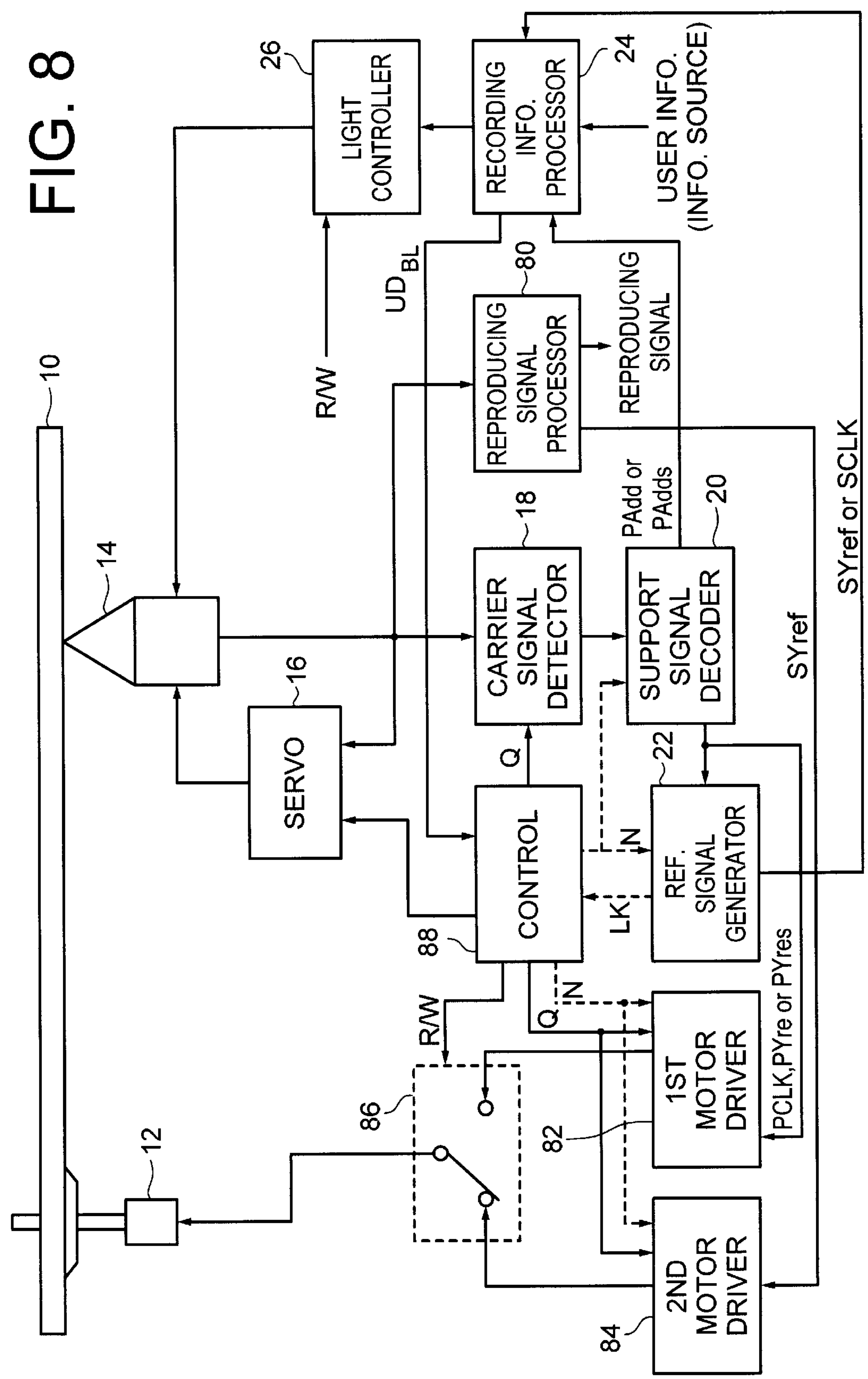
FIG. 8 is a schematic block diagram showing a configuration of an optical disc recording/reproducing apparatus according to an embodiment of the present invention.

Referring to FIG. 8, there is shown a rate-variable optical disc recording/reproducing apparatus according to an embodiment of the present invention that includes a spindle motor 12 for rotating an optical disc 10, and a servo portion 16 connected to an optical pickup 14. In the optical disc 10, land and groove tracks, not shown, are formed in parallel in such a manner to make a concentric or spiral shape, and wobble portions, not shown, wobbled in a certain range of period are defined in all of or any one side of two boundary sides in which the land and groove tracks are adjacent to each other. These wobbled portions are pre-formatted by a support information including a synchronous signal PYre, a support identification code PID and a support clock PCLK called "bi-phase clock". The optical pickup 14 irradiates a single main light beam MB onto and two support light beams $SB_1$ and $SB_2$ onto the land and groove tracks of the optical disc 10, thereby recording a user data by the main light beam MB and reading out a support information by the support light beams $SB_1$ and $SB_2$. The optical pickup 14 converts the two support light beams $SB_1$ and $SB_2$ reflected by the optical disc 10 into an electrical signal to generate the first and second radio frequency signals. The servo portion 16 controls the size and position of light beams MB, $SB_1$ and $SB_2$ irradiated onto the land or groove track of the optical disc 10 based on the first and second radio frequency signals from the optical pickup 14.

The rate-variable optical disc recording/reproducing apparatus further includes a carrier signal detector 18 and a support signal decoder 20 that are connected to the optical pickup 14 in serial. The carrier signal detector 18 filters the first and second radio frequency signals from the optical pickup 14 and adds the filtered radio frequency signals, thereby detecting a carrier signal Pc pre-formatted in the wobbled portion of the optical disc 10. The frequency of the carrier signal detected by the carrier signal detector 18 is shifted depending upon the recording rate of information, that is, the rotation velocity of optical disc. In order to accurately detect the carrier signal in which its frequency is shifted in accordance with the recording rate, the carrier signal detector 18 shifts a filtering frequency band in accordance with a value of recording rate information Q. The support signal decoder 20 reconstructs the synchronous signal PYre, the bi-phase clock PCLK and the support identification code PID from the carrier signal Pc from the carrier signal detector 18 and, at the same time, decodes a support address PAdd included in the support identification code PID. Further, the support signal decoder 20 may produce the second support synchronous signal PYres for subdividing the frame divided by the support synchronous signal PYre into at least two sub-frames and the second support address PAdds for indicating a physical position of each sub-frame by utilizing the support synchronous signal PYre, the bi-phase clock PCLK and the support address PAdd. A region between the support synchronous signals PYre, that is, the number of sub-frames included in a single frame is determined by a region dividing information N supplied from a control 30 to the support signal decoder 20. The frequencies of the support synchronous signal PYre, the second support synchronous signal PYres and the bi-phase clock PCLK are shifted in accordance with a variation in the rotation velocity of the optical disc, that is, in the playing speed of the land and groove tracks.

Moreover, the optical disc recording/reproducing apparatus further includes a reference signal generator 22 for generating a reference synchronous signal SYref and a reference clock SCLK, and a light controller 26 connected between a recording information processor 24 and the optical pickup 14. The reference signal generator 22 applies the support synchronous signal PYre or the second support synchronous signal PYres from the support signal decoder 20 to the recording information processor 24 as a reference synchronous signal SYref. Also, the reference signal generator 22 frequency-multiplies the bi-phase clock PCLK from the support signal decoder 20 by a constant multiplication ratio, and then applies the multiplied signal to the recording information processor 24 as the reference clock SCLK. The frequencies of these reference synchronous signal SYref and reference clock SCLK are shifted in accordance with a variation in the rotation velocity of the optical disc 10, that is, the playing speed of the land and groove tracks like the frequencies of the support synchronous signal PYre, the second support synchronous signal PYres and the bi-phase clock PCLK. Otherwise, the reference signal generator 22 may inputs the region dividing information N additionally, and may frequency-multiplies the bi-phase clock PCLK by a multiplication ratio based on a value of the region dividing information N. In other words, the reference signal generator 22 may control a frequency ratio of the reference clock SCLK to the bi-phase clock PCLK in accordance to the region dividing information N. More specifically, the reference clock SCLK has M times the frequency of the bi-phase clock PCLK when the region dividing information N is “1”; while it has M×N times the frequency of the bi-phase clock PCLK when the region dividing information N is more than “1”.

Next, the recording information processor 24 combines the reference synchronous signal SYref from the reference signal generator 22 with the support address PAdd from the support signal decoder 20 to produce a frame header FH, and simultaneously make a block of a user information the information source into a certain size of user information blocks UDB. The recording information processor 24 generates user information frames UDF by adding the user information block UDB to the frame header FH. The user information frame UDF generated at the recording information processor 24 in this manner is transferred to the light controller 26 in conformity to the reference clock SCLK. Then, the light controller 26 allows the user information frame UDF to be recorded on a position, that is, a frame in land or groove track of the optical disc assigned by the support address PAdd by switching the main light beam MB generated at the optical pickup 14 in accordance with a logical value of an output signal of the recording information processor 24. Accordingly, a rate in which d user information is recorded on the optical disc 10, changes in accordance with a rate in which the land and groove tracks is played. Otherwise, the recording information processor 24 may generate the user information frame UDF adding the second support address PAdds instead of the support address PAdd, and may transfer the user information frame UDF to the light controller in conformity to the reference clock SCLK generated at the reference clock generator 22. The reference clock SCLK in this case has N time the frequency compared with the case where the support address PAdd is included in the user information frame UDF. The light controller 26 switching a main light beam MB in accordance with a logical value of an output signal of the recording information processor 24 records the user information frame UDF on a position of the land or groove in the optical disc 10, that is, on a sub-frame. Accordingly, N number of user information frames UDF is recorded on the frame in the land and groove track specified by the support synchronous signal PYre. Therefore, a recording capacity of the optical disc 10 increases by N times. Also, a rate at which the user information is recorded on the optical disc 10 varies in accordance with a playing speed of the land and groove tracks.

The rate-variable optical recording/reproducing apparatus further includes a first motor driver 82 for receiving the bi-phase clock PCLK, the support synchronous signal PYre or the second support synchronous signal PYres from the support synchronous decoder 20, a second motor driver 84 for receiving the reference synchronous signal SYref reproduced from a reproducing signal processor 80, and a control switch 86 for switching first and second motor driving voltage signals $CMW_1$ and $CMW_2$ from the first and second motor drivers 82 and 84 into the spindle motor 12. The reproducing signal processor 80 reconstructs the user information frame UDF from the third radio frequency signal applied from the optical pickup 14. Also, the reproducing signal processor 80 separates the user information block UDB and the frame header FH from the reconstructed user information frame UDF and, at the same time, detects a reference synchronous signal SYref included in the frame header FH. The detected reference synchronous signal SYref has the same frequency as the support synchronous signal PYre when the user information frame UDF is normally recorded on the optical disc 10. Otherwise, the reference synchronous signal SYref has the same frequency as the second support synchronous signal PYres when the user information frame UDF is recorded on the optical disc 10 with an N times density.

The first motor driver 82 varies a rotation speed of the spindle motor 12 in such a manner that the track of the optical disc 10 plays at a constant rate corresponding to a rate information Q from a control 88. To this end, the first motor driver 82 generates the first motor driving voltage signal $CMW_1$ for controlling the rotation speed of the spindle motor 12 by utilizing the rate information Q from the control 88 and the support synchronous signal PYre, the second support synchronous signal PYres or the bi-phase clock PCLK. Further, the first motor driver 82 receives the region dividing information N in addition to the rate information Q when the rotation speed of the spindle motor 12 is controlled by the support synchronous signal PYre and the second support synchronous signal PYres, that is, when all of the user information frames UDF recorded on the optical disc 10 with the normal density and with N times the normal density are reproducible. To attain such a function, the first motor driver 82 can be configured as FIG. 3, FIG. 5 or FIG. 6 as described earlier.

The second motor driver 84 varies the rotation speed of the spindle motor 12 in such a manner that the track of the optical disc 10 plays at a constant speed corresponding to the rate information Q from the control 88 at the time of reproducing. To this end, the second motor driver 84 generates the second motor driving voltage signal $CMW_2$ for controlling the rotation speed of the spindle motor 12 by utilizing the rate information Q from the control 88 and the reference synchronous signal SYref from the reproducing signal processor 80. Further, the second motor driver 84 receives the region dividing information N in addition to the rate information Q when allowing all of the user information frames UDF recorded on the optical disc 10 with the normal density and with N times the normal density to be reproducible. In this case, the second motor driver 84 generates the second motor driving voltage signal $CMW_2$ for controlling a playing speed of the track of the optical disc 10 by utilizing the region dividing information N, the rate information Q and the reproduced reference synchronous signal SYref.

The first and second motor driving voltage signals $CMW_1$ and $CMW_2$ are selectively supplied to the spindle motor 12 by means of the control switch 86, thereby allowing the track of the optical disc 10 to be played at a constant speed. The control switch 86 selectively applies the first and second motor driving voltage signals $CMW_1$ and $CMW_2$ to the spindle motor 12 by a recording/reproducing control signal R/W. More specifically, the control switch 86 delivers the first motor driving voltage signal $CMW_1$ into the spindle motor 12 in the recording mode while it delivers the second motor driving voltage signal $CMW_2$ into the spindle motor 12 in the reproducing mode.

The control 88 supplies a reference data concerning the position of the optical pickup 14 and the position and size of light beam, etc. to the servo portion 16. Also, the control 88 supplies the region diving information N to the support signal decoder 20, the reference signal generator 22 and the first and second motor drivers 82 and 84 when intending to divide the frame specified by the support synchronous signal PYre into at least two sub-frames. Further, the control 88 receives a rate information $UD_{BL}$ on the transfer rate of the user information supplied to the recording information processor 24 from an information source, not shown, from the recording information processor 24. Then, the control 88 calculates a recording rate corresponding to a transfer rate of the user information by the rate information $UD_{BL}$, not shown, from the recording information processor 24 and supplies the rate information Q to the first motor driver 82. The control 88 may determine if the user information frame UDF will be recorded on the optical disc 10 with a normal density or with N times the normal density by receiving a reproducing rate information $PD_{BL}$ on the reproducing rate of the user information frame UDF from the reproducing signal processor 80 at the time of reproducing. In this case, the control 88 generates a region dividing information N having a value based on a density of the user information frame UDF and supplies it to the second motor driver 84. Finally, the control 88 generates a recording/reproducing control signal R/W for controlling the control switch 86 and the light controller 26 in accordance with the recording mode and the reproducing mode, respectively.

Figure 9:
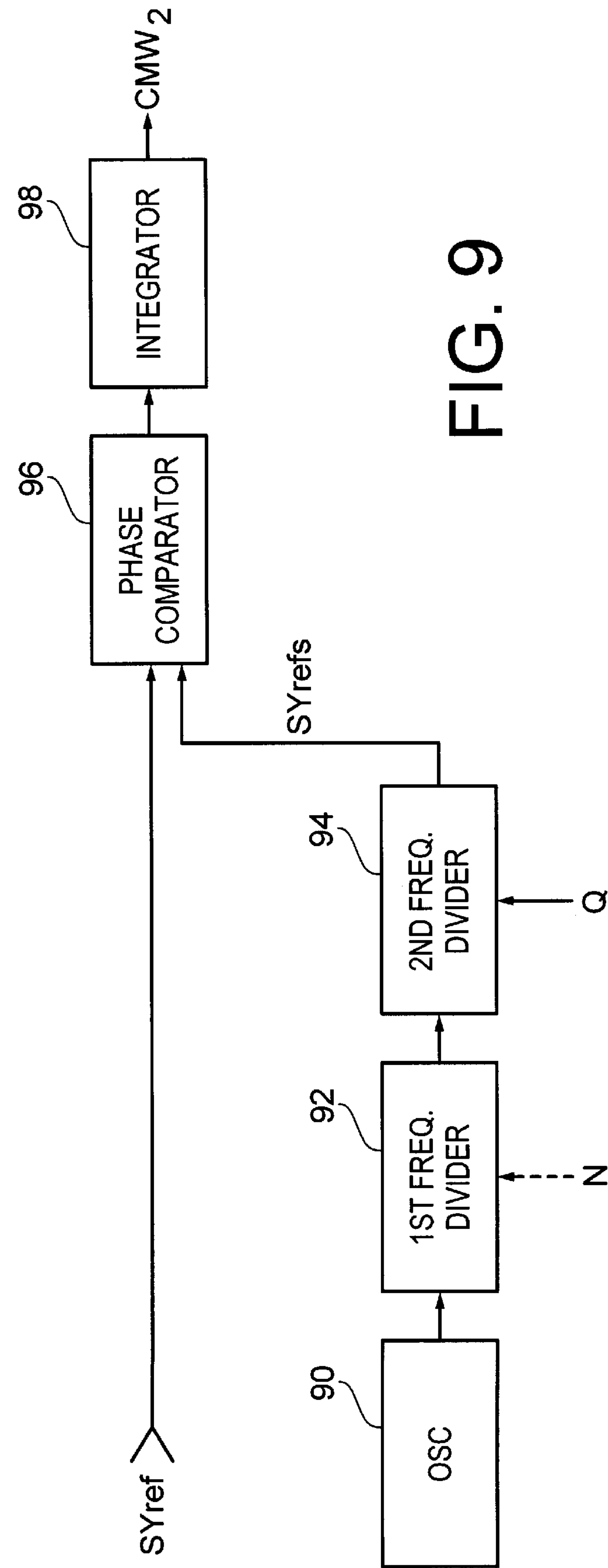
FIG. 9 is a detailed block diagram of the second motor driver shown in FIG. 8.

FIG. 9 is a detailed block diagram of the second motor driver 84 shown in FIG. 8. As shown in FIG. 9, the second motor driver 84 includes first and second frequency dividers 92 and 94 connected to an oscillator 90 in serial. The oscillator 90 generates a second reference clock having a frequency corresponding to the bit number of an information which is recorded on the frame divided by the support synchronous signal PYre pre-formatted on the optical disc 10 at the time of normal reproducing. The first frequency divider 92 frequency-divides the second reference clock from the oscillator 90 by a frequency division ratio of "X/32" to thereby generate a clock signal having a frequency corresponding to 32 times the frequency of the support synchronous signal PYre reconstructed from the optical disc 10 at the time of normal reproducing. In the above frequency division ratio, "X" represents the bit number of a user information recorded on the frame specified by the support synchronous signal PYre at the time of normal reproducing; and "32" does a ratio of the reproducing rate at the time of normal reproducing to the adjustable maximum reproducing rate. These "x" and "32" are set to the first frequency divider 92 by a manufacturer. Otherwise, the first frequency divider 92 may frequency-divide the second reference clock from the oscillator 90 by a frequency division ratio of "X/32N" by utilizing a value of the region dividing information N from the control 88 shown in FIG. 8, to thereby generate a clock signal having a frequency corresponding to 32 times the frequency of the second support synchronous signal PYres reconstructed from the optical disc 10 at the time of normal reproducing. In the above frequency division ratio, "X" represents the bit number of a user information recorded on the frame specified by the support synchronous signal PYre at the time of normal reproducing; "N", which is a region dividing information for controlling the recording density, does a ratio of the second support synchronous signal PYres to the support synchronous signal PYre, generated by the support signal decoder 20; and "32" does a ratio of the reproducing rate at the time of normal reproducing to the adjustable maximum reproducing rate. The "x" and "32" are set to the first frequency divider 92 by a manufacturer while the "N" is supplied from the control 88 shown in FIG. 8.

The second frequency divider 94 frequency-divides a clock signal from the first frequency divider 92 in accordance with a value of the recording rate information Q from the control 88 shown in FIG. 8 to generate a second reference synchronous signal SYrefs with various frequencies. The second reference synchronous signal SYrefs has the same frequency as the support synchronous signal PYre or the second support synchronous signal PYres, or 2, 4, 8, 1/2, 1/4 or 8/1 times the frequency of the bi-phase clock PCLK at the time of normal reproducing in accordance with a value of the rate information Q. Accordingly, the second frequency divider 94 frequency-divides the clock signal from the first frequency divider 92 by 32 when the rate information Q is "1", and thus generates the second reference synchronous signal SYrefs having the same frequency as the support synchronous signal PYre or the second support synchronous signal PYres at the time of normal recording by controlling a duty cycle of the frequency-divided clock signal. When the recording rate information Q is "2", "4" or "8", the second frequency divider 94 frequency-divides the clock signal from the first frequency divider 92 by 16, 8 or 4, respectively, thereby generating the second reference synchronous signal SYrefs having 2, 4 or 8 times the frequency of the support synchronous signal PYre or the second support synchronous signal PYres at the time of normal recording, respectively, by controlling a duty cycle of the frequency-divided clock signal. When the recording rate information Q is "1/2", "1/4" or "1/8", the second frequency divider 94 frequency-divides the clock signal from the first frequency divider 92 by 64, 128 or 256, respectively, and thus generates the second reference synchronous signal SYrefs having the 1/2, 1/4 or 1/8 times the frequency of the support synchronous signal PYre or the second support synchronous signal PYres at the time of normal recording, respectively, by controlling a duty cycle of the frequency-divided clock signal. The frequency of the second reference synchronous signal SYrefs varying as described above assigns a playing speed of the track of the optical disc 10 and simultaneously determines a rate of the user information recorded on the optical disc 10.

Moreover, the second motor driver 84 further includes a phase comparator 96 for receiving the reference synchronous signal SYref from the reproducing signal processor 80 shown in FIG. 8 and the second reference synchronous signal SYrefs from the second frequency divider 94, and an integrator 98 connected to the phase comparator 96. The phase comparator 96 compares the phase of the reference synchronous signal SYref with that of the second reference synchronous signal SYrefs to detect the phase difference and the sequence relationship in the phase. The phase comparator 96 generates a phase error voltage signal $\Delta V$ having a positive(+) or negative(−) sign and a size corresponding to a phase difference $\Delta\phi$ in accordance with the sequence relationship, that is, the advance and lag in the phase.

Figures 10A, 10B, 10C:
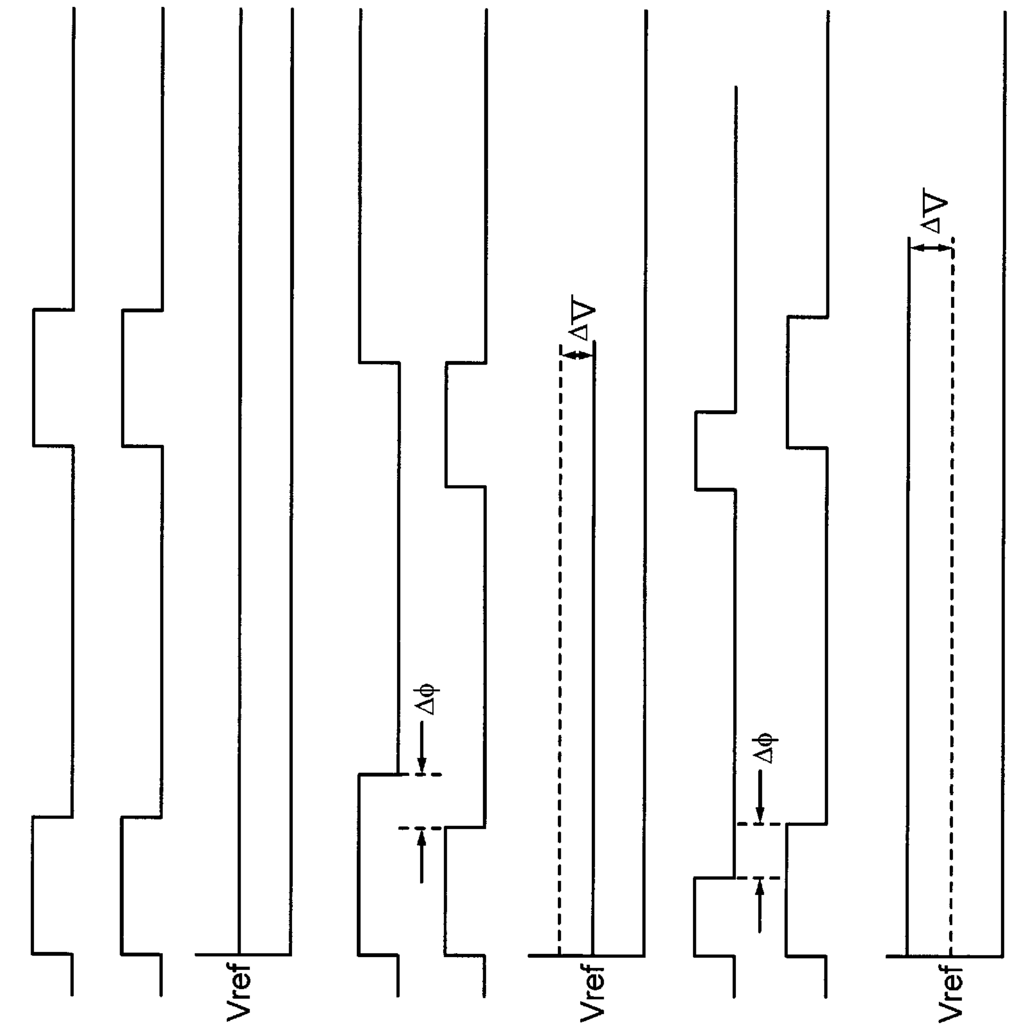
FIG. 10 is an operational waveform diagram of each part of the circuit shown in FIG. 9.

The integrator 98 integrates the phase error voltage signal $\Delta V$ from the phase comparator 96, thereby generating a second motor driving voltage signal $CMW_2$ which adds and subtracts the phase error voltage signal $\Delta V$ to and from the previously integrated voltage Vref. As shown in FIG. 10(A), this motor driving voltage signal $CMW_2$ maintains the previously integrated voltage Vref as it was when the phase of the reference synchronous signal SYref is equal to that of the second reference synchronous signal SYrefs. As shown in FIG. 10(B), the second motor driving voltage signal $CMW_2$ maintains a lower voltage than the previously integrated voltage Vref by $\Delta V$ when the phase of the reference synchronous signal SYref is more advanced than that of the second reference synchronous signal SYrefs by $\Delta\phi$. On the other hand, as shown in FIG. 10(C), the second motor driving voltage signal $CMW_2$ maintains a higher voltage than the previously integrated voltage Vref by $\Delta V$ when the phase of the reference synchronous signal SYref is more lagged than that of the second reference synchronous signal SYrefs by $\Delta\phi$. The second motor driving voltage $CMW_2$ generated at the integrator 98 is applied via the control switch 86 shown in FIG. 8 to the spindle motor 12 to control the rotation velocity of the optical disc 10.

As described above, the second motor driving voltage signal $CMW_2$ maintains a constant voltage from the time at which the phase of the reference synchronous signal SYref becomes equal to that of the second reference synchronous signal SYrefs, after it varies until the reference synchronous signal SYref from the reproducing signal processor 80 has the same phase as the second reference synchronous signal SYrefs. Accordingly, the track of the optical disc 10 plays at a variable velocity based on the frequency of the second reference synchronous signal SYrefs.

As described above, an optical disc recording rate control apparatus according to an embodiment of the present invention not only varies a reference clock used to transfer the user information frame to the optical disc in accordance with a reproducing rate of the support information pre-formatted on the optical disc, but also it changes a playing speed of the track of the optical disc in accordance with a transfer rate of the user information from the information source, so that it can vary a recording rate of the user information. Accordingly, a rate-variable optical disc recording apparatus according to an embodiment of the present invention can not only shorten the time when the user information is recorded on the optical disc, but also it can record the user information on the optical disc in real time. Also, the rate-variable optical disc recording apparatus according to an embodiment of the present invention varies a frequency of the reference clock by N times, so that it can record the user information on the optical disc with N times the recording density.

Further, a rate-variable optical disc recording/reproducing apparatus according to the present invention generates a comparing synchronous signal in which its frequency is varied in accordance with a playing speed of the track of the optical disc at the time of reproducing, and controls the rotation velocity of the optical disc based on a phase difference between the comparing synchronous signal and the reproduced reference synchronous signal, so that it can vary a reproducing rate of the optical disc. Accordingly, an optical disc recording/reproducing rate control apparatus according to the present invention can reproduce the user information recorded on the optical disc at a variable rate.

Although the present invention has been described by the preferred embodiments illustrated in drawings hereinbefore, it is apparent from the above description to those ordinarily skilled in the art that various changes and modifications of the invention is possible without departing from the spirit thereof. Accordingly, the scope of the invention should be determined not by the embodiments illustrated and described, but by the appended claims and their equivalents.

What is claimed is:

1. A rate-variable optical disc reproducing apparatus, comprising:

means for inputting a rate of a user information to be reproduced from an optical disc, said user information being recorded on a track of the optical disc along with a first predetermined period of first frequency signal for dividing said track of the optical disc into unit regions having a predetermined size;

frequency signal generating means for generating a second frequency signal having a period changed in accordance with said rate of said user information;

means for reproducing said first frequency signal and said user information from said track of the optical disc; and means for comparing said first frequency signal from said reproducing means with said second frequency signal from said frequency signal generating means to control a rotation velocity of the optical disc.

2. A rate-variable optical disc reproducing method, comprising the steps of:

inputting a rate of a user information to be reproduced from an optical disc, said user information being recorded on a track of the optical disc along with a first predetermined period of first frequency signal for dividing said track of the optical disc into unit regions having a predetermined-size;

generating a second frequency signal having a period changed in accordance with said rate of said user information;

reproducing said first frequency signal and said user information from said track of the optical disc; and comparing said first frequency signal with said second frequency signal to control a rotation velocity of the optical disc.

3. A rate-variable optical disc recording apparatus, comprising:

means for detecting a first predetermined period of first frequency signal for dividing a track of an optical disc into unit regions having a predetermined size from the optical disc, said first frequency signal being pre-formatted on the optical disc;

first frequency signal generating means for generating a second predetermined period of second frequency signal adaptively changing in response to a variation in the period of said first frequency signal from said detecting means;

means for recording a user information supplied from a information source on the optical disc by synchronizing the user information with said second frequency signal from said first frequency signal generating means;

second frequency signal generating means for generating a third frequency signal having a period changed in accordance to a transfer rate of the user information supplied from the information source to said recording means; and means for comparing said first frequency signal with said third frequency signal to control a rotation velocity of the optical disc.

4. The rate-variable optical disc recording apparatus as claimed in claim 3, wherein said first frequency signal is a support synchronous signal arranged every unit region on the optical disc.

5. A rate-variable optical disc recording method, comprising the steps of:

detecting a first predetermined period of first frequency signal for dividing a track of an optical disc into unit regions having a predetermined size from the optical disc, said first frequency signal being pre-formatted on the optical disc;

generating a second predetermined period of second frequency signal adaptively changing in response to a variation in the period of said first frequency signal;

recording a user information supplied from a information source on the optical disc by synchronizing the user information with said second frequency signal;

generating a third frequency signal having a period changed in accordance to a transfer rate of the user information supplied from the information source; and comparing said first frequency signal with said third frequency signal to control a rotation velocity of the optical disc.

6. The rate-variable optical disc recording method as claimed in claim 5, wherein said first frequency signal is a support synchronous signal arranged every unit region on the optical disc.

7. A rate-variable optical disc recording apparatus, comprising:

means for detecting a first predetermined period of first frequency signal for dividing a track of an optical disc into unit regions having a predetermined size and a second predetermined period of second frequency signal for subdividing each of said unit regions into subdivided regions from the optical disc, said first and second frequency signals being pre-formatted on the optical disc;

first frequency signal generating means for generating a third predetermined period of third frequency signal adaptively changing in response to a period variation in any one of said first and second frequency signals from said detecting means;

means for recording a user information supplied from a information source on the optical disc by synchronizing the user information with said third frequency signal from said first frequency signal generating means;

second frequency signal generating means for generating a fourth frequency signal having a period changed in accordance to a transfer rate of the user information supplied from the information source; and means for comparing any one of said first and second frequency signals from said detecting means with said fourth frequency signal from said second frequency signal generating means to control a rotation velocity of the optical disc.

8. The rate-variable optical disc recording apparatus as claimed in claim 7, wherein said fourth frequency signal is compared with said second frequency signal.

9. The rate-variable optical disc recording apparatus as claimed in claim 8, wherein said second frequency signal is a bi-phase clock used to modulate said first frequency signal.

10. A rate-variable optical disc recording method, comprising the steps of:

detecting a first predetermined period of first frequency signal for dividing a track of an optical disc into unit regions having a predetermined size and a second predetermined period of second frequency signal for subdividing each of said unit regions into subdivided regions from the optical disc, said first and second frequency signals being pre-formatted on the optical disc;

generating a third predetermined period of third frequency signal adaptively changing in response to a variation in the period of any one side of said first and second frequency signals;

recording a user information supplied from a information source on the optical disc by synchronizing the user information with said third frequency signal;

generating a fourth frequency signal having a period changed in accordance to a transfer rate of the user information supplied from the information source; and comparing any one of said first and second frequency signals with said fourth frequency signal to control a rotation velocity of the optical disc.

11. The rate-variable optical disc recording method as claimed in claim 10, wherein said fourth frequency signal is compared with said second frequency signal.

12. The rate-variable optical disc recording method as claimed in claim 11, wherein said second frequency signal is a bi-phase clock used to modulate said first frequency signal.

* * * * *